United States Patent
Keeling

(10) Patent No.: US 12,485,015 B2
(45) Date of Patent: Dec. 2, 2025

(54) MAGNETIC JOINT IMPLANTS

(71) Applicant: John Keeling, Chevy Chase, MD (US)

(72) Inventor: John Keeling, Chevy Chase, MD (US)

( * ) Notice: Subject to any disclaimer, the term of this patent is extended or adjusted under 35 U.S.C. 154(b) by 549 days.

(21) Appl. No.: 18/082,864

(22) Filed: Dec. 16, 2022

(65) Prior Publication Data
US 2024/0197489 A1    Jun. 20, 2024

(51) Int. Cl.
*A61F 2/42* (2006.01)
*A61F 2/30* (2006.01)

(52) U.S. Cl.
CPC .......... *A61F 2/4241* (2013.01); *A61F 2/4225* (2013.01); *A61F 2002/30079* (2013.01); *A61F 2002/4228* (2013.01); *A61F 2002/4251* (2013.01); *A61F 2220/0025* (2013.01)

(58) Field of Classification Search
CPC ............ A61F 2/4225; A61F 2002/4228; A61F 2002/4233; A61F 2002/4238; A61F 2002/30079; A61B 2017/00876
See application file for complete search history.

(56) References Cited

U.S. PATENT DOCUMENTS

| | | | | |
|---|---|---|---|---|
| 4,024,588 A | * | 5/1977 | Janssen | A61F 2/4202 623/18.12 |
| 5,879,386 A | * | 3/1999 | Jore | A61F 2/38 623/16.11 |
| 2002/0111690 A1 | * | 8/2002 | Hyde | A61B 17/1668 623/18.12 |
| 2018/0221161 A1 | | 8/2018 | Feffery | |
| 2019/0021776 A1 | * | 1/2019 | Archbold | A61B 17/8625 |

FOREIGN PATENT DOCUMENTS

| | | | |
|---|---|---|---|
| CN | 104622616 A | * | 5/2015 |
| WO | 2020050811 | | 3/2020 |

* cited by examiner

*Primary Examiner* — Javier G Blanco
(74) *Attorney, Agent, or Firm* — Edison Law Group, PLLC

(57) ABSTRACT

One example embodiment is an apparatus comprising an implant for a metatarsal phalangeal joint, the implant including a first magnet and a second magnet configured such that the first magnet magnetically opposes the second magnet, wherein the first magnet is positioned on a phalanx side of the metatarsal phalangeal joint, and the second magnet is positioned on a metatarsal side of the metatarsal phalangeal joint.

4 Claims, 1 Drawing Sheet

MAGNETIC JOINT IMPLANTS

TECHNICAL FIELD

The present invention relates to joint implants and, in a preferred set of embodiments, is a magnetic joint implant.

BACKGROUND

Phalangeal joints, such as the big toe of the human body, may undergo arthritic changes over the course of life. Likewise, arthritic changes may impact spinal discs. Currently, treatment of phalangeal joints involves surgical excision of bone spurs, fusing the joint, or replacing the joint. There are issues with all of these procedures. Fusion removes all motion of the joint. Joint replacements are prone to loosening due to the friction and subsequent wear that occurs when bearing surfaces rub against each other. Current joint replacements are typically fabricated of metal, plastic, or silicone. These replacements act by providing a pair of bearing surfaces that oppose and rub against one another. This ultimately results in wear particles and aseptic loosening and failure of the implant. Accordingly, what is needed is an improved implant for metatarsal phalangeal joints, metacarpal phalangeal joints, and/or spinal discs.

SUMMARY

One example embodiment provides an implant for a metatarsal phalangeal joint of a hallux. The implant includes a first magnet and a second magnet configured such that the first magnet magnetically opposes the second magnet. The first magnet is positioned on a phalanx side of the metatarsal phalangeal joint, and the second magnet is positioned on a metatarsal side of the metatarsal phalangeal joint. This implant creates a metatarsal phalangeal joint that can move freely without frictional rubbing, thereby decreasing the likelihood of joint loosening.

Another example embodiment provides an implant for a lesser toe joint. The implant includes a first magnet and a second magnet configured such that the first magnet magnetically opposes the second magnet. The first magnet is positioned on a phalanx side of the lesser toe joint, and the second magnet is positioned on a metatarsal side of the lesser toe joint. This implant creates a lesser toe joint that can move freely without frictional rubbing, thereby decreasing the likelihood of joint loosening.

Yet another example embodiment provides an implant for a spinal disc. The implant includes a first magnet and a second magnet configured such that the first magnet magnetically opposes the second magnet. The first magnet is positioned on a first side of the spinal disc, and the second magnet is positioned on a second side of the spinal disc. This implant creates a spinal disc that can move freely without frictional rubbing, thereby decreasing the likelihood of joint loosening.

Still another example embodiment provides an implant for a finger joint. The implant includes a first magnet and a second magnet configured such that the first magnet magnetically opposes the second magnet. The first magnet is positioned on a phalanx side of the finger joint, and the second magnet is positioned on a metacarpal side of the finger joint. This implant creates a finger joint that can move freely without frictional rubbing, thereby decreasing the likelihood of joint loosening.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figure, is not intended to limit the scope of the application as claimed but is merely representative of selected embodiments. Multiple embodiments depicted herein are not intended to limit the scope of the solution.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one example. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow.

Figure 1:
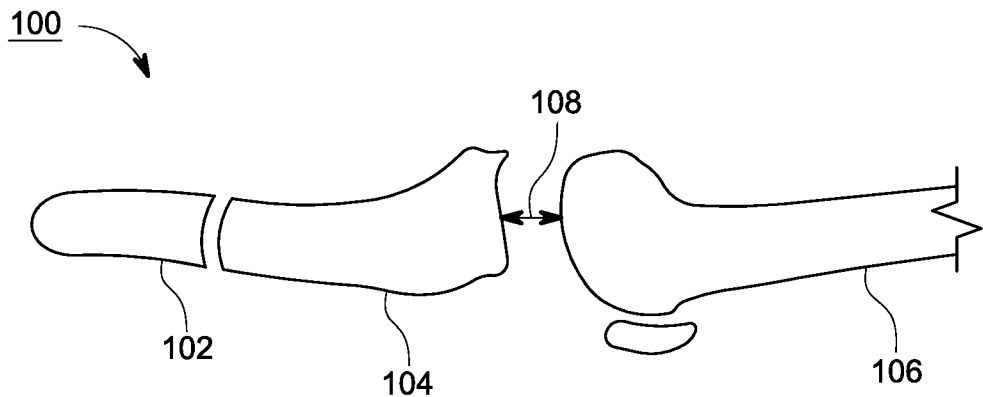
FIG. 1 illustrates a metatarsal phalangeal joint that is narrowed due to arthritic changes.

FIG. 1 illustrates a metatarsal phalangeal joint 100 that is narrowed due to arthritic changes. The joint 100 includes a distal phalanx 102, a proximal phalanx 104, and a first metatarsal 106 bone. One example of such a joint is the hallux (big toe) of a human foot. A narrowed portion 108 due to arthritic changes may exist between the proximal phalanx 104 and the first metatarsal bone 106. Likewise, arthritic changes may impact one or more metacarpal phalangeal joints of a human hand, wherein a narrowed portion may exist between a proximal phalanx of the hand and a first metacarpal bone.

Figure 2:
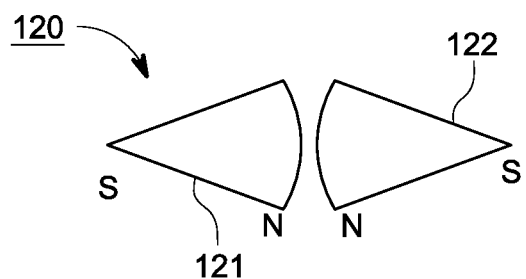
FIG. 2 illustrates an opposed pair of frictionless conical magnets.

FIG. 2 illustrates an opposed pair 120 of frictionless conical magnets including a first magnet 121 and a second magnet 122. In some embodiments, the first and second magnets 121, 122 may be neodymium magnets. The first and second magnets 121, 122 are oriented in a first opposing configuration where the North pole of the first magnet 121 is facing the North pole of the second magnet 122, such that a first magnetic force of the first magnet 121 repels a second magnetic force of the second magnet 122. Thus, the first magnet 121 magnetically opposes the second magnet 122. As an alternative to the first opposing configuration, the first and second magnets 121, 122 can be oriented in a second opposing configuration where the South pole of the first magnet 121 is facing the South pole of the second magnet 122, such that a third magnetic force of the first magnet 121 repels a fourth magnetic force of the second magnet 122.

Figure 3:
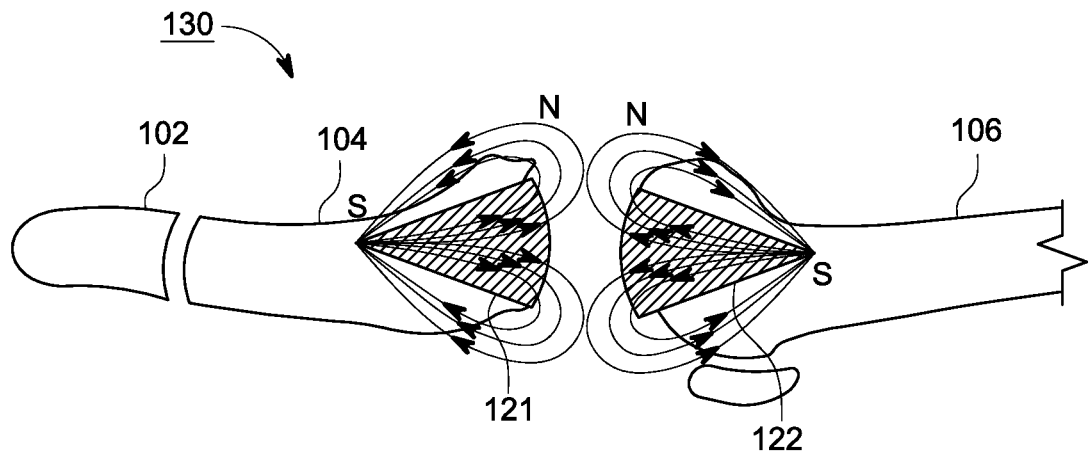
FIG. 3 illustrates a metatarsal phalangeal joint implant, according to example embodiments.

FIG. 3 illustrates a metatarsal phalangeal joint implant 130, according to example embodiments. The implant includes the first magnet 121 and the second magnet 122 configured such that the first magnet 121 opposes the second magnet 122. The first magnet 121 is positioned on the proximal phalanx 104 side of the metatarsal phalangeal joint, and the second magnet is positioned on the metatarsal 106 side of the metatarsal phalangeal joint at a head of the first metatarsal 106. This implant 130 creates a metatarsal phalangeal joint that can move freely without frictional rubbing, thereby decreasing the likelihood of joint loosening.

Another example embodiment provides an implant for a lesser toe joint. The implant includes the first magnet 121 and the second magnet 122 (FIGS. 2 and 3) configured such that the first magnet 121 opposes the second magnet 122. The first magnet 121 is positioned on the proximal phalanx 104 side of the lesser toe joint, and the second magnet 122 is positioned on the metatarsal 106 side of the lesser toe joint at a head of the first metatarsal bone 106. This implant creates a lesser toe joint that can move freely without frictional rubbing, thereby decreasing the likelihood of joint loosening.

Yet another example embodiment provides an implant for a spinal disc. The implant includes the first magnet 121 and the second magnet 122 (FIG. 2) configured such that the first magnet 121 opposes the second magnet 122. The first magnet 121 is positioned on a first side of the spinal disc, and the second magnet 122 is positioned on a second side of the spinal disc. This implant creates a spinal disc that can move freely without frictional rubbing, thereby decreasing the likelihood of joint loosening.

Still another example embodiment provides an implant for a finger joint. The implant includes the first magnet 121 (FIG. 2) and the second magnet 122 configured such that the first magnet 121 opposes the second magnet 122. The first magnet 121 is positioned on a phalanx side of the finger joint, and the second magnet 122 is positioned on a metacarpal side of the finger joint. This implant creates a finger joint that can move freely without frictional rubbing, thereby decreasing the likelihood of joint loosening.

The diagrams depicted herein, such as FIGS. 1-3, are separate examples but may be the same or different embodiments. Any of the operations in one diagram could be adopted and shared with another diagram. No example operation is intended to limit the subject matter of any embodiment or corresponding claim.

As will be appreciated by one skilled in the art, aspects of the present application may be embodied as an apparatus, method, or computer program product. Although an exemplary embodiment of at least one of a system, method, and apparatus has been illustrated in the accompanied drawings and described in the foregoing detailed description, it will be understood that the application is not limited to the embodiments disclosed, but is capable of numerous rearrangements, modifications, and substitutions as set forth and defined by the following claims. Presenting the above-described functions as being performed by an apparatus is not intended to limit the scope of the present application in any way but is intended to provide one example of many embodiments.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A metatarsophalangeal (MTP) joint implant for a metatarsal phalangeal joint, the implant including a first frictionless conical magnet and a second frictionless conical magnet configured such that the first frictionless conical magnet magnetically opposes the second frictionless conical magnet and a first magnetic force of the first frictionless conical magnet repels a second magnetic force of the second frictionless conical magnet, wherein the first frictionless conical magnet comprises a phalanx-bone-engaging surface and is sized and configured to be positioned on a phalanx side of the metatarsal phalangeal joint, and the second frictionless conical magnet comprises a metatarsal-bone-engaging surface and is sized and configured to be positioned on a metatarsal side of the metatarsal phalangeal joint.

2. The metatarsophalangeal (MTP) joint implant of claim 1, wherein at least one of the first frictionless conical magnet or the second frictionless conical magnet comprises a neodymium magnet.

3. A lesser toe joint implant for a lesser toe joint, the implant including a first frictionless conical magnet and a second frictionless conical magnet configured such that the first frictionless conical magnet magnetically opposes the second frictionless conical magnet and a first magnetic force of the first frictionless conical magnet repels a second magnetic force of the second frictionless conical magnet, wherein the first frictionless conical magnet comprises a phalanx-bone-engaging surface and is sized and configured to be positioned on a phalanx side of the lesser toe joint, and the second frictionless conical magnet comprises a metatarsal-bone-engaging surface and is sized and configured to be positioned on a metatarsal side of the lesser toe joint.

4. The lesser toe joint implant of claim 3, wherein at least one of the first frictionless conical magnet or the second frictionless conical magnet comprises a neodymium magnet.

* * * * *